(12) United States Patent
Gettemy et al.

(10) Patent No.: US 6,618,044 B1
(45) Date of Patent: Sep. 9, 2003

(54) SELECTIVELY RELOCATABLE AND UNIVERSAL INTERFACE MODULE WITH CIRCUITRY FOR A DISPLAY SCREEN

(75) Inventors: Shawn Gettemy, San Jose, CA (US); Troy Hulick, Saratoga, CA (US); Eric Fuhs, Crystal Lake, IL (US); Frank Canova, Fremont, CA (US)

(73) Assignee: Palm Inc., Santa Clara, CA (US)

( * ) Notice: Subject to any disclaimer, the term of this patent is extended or adjusted under 35 U.S.C. 154(b) by 0 days.

(21) Appl. No.: 09/579,123

(22) Filed: May 25, 2000

(51) Int. Cl.[7] .................................. G09G 5/00
(52) U.S. Cl. ................... 345/204; 361/681; 361/683
(58) Field of Search .......................... 361/681, 683, 361/684, 685, 686, 725, 731; 312/223.2; 345/204

(56) References Cited

U.S. PATENT DOCUMENTS 5,295,089 A * 3/1994 Ambasz .................... 361/681
5,805,416 A * 9/1998 Friend et al. ............. 361/686
6,052,279 A * 4/2000 Friend et al. ............. 361/686

* cited by examiner

Primary Examiner—Kent Chang
Assistant Examiner—Tom V. Sheng
(74) Attorney, Agent, or Firm—Wagner, Murabito, & Hao LLP

(57) ABSTRACT

A portable computer system (e.g., a palmtop or hand-held computer system) with a universal interface module containing circuitry needed to connect with and operate a device such as a display device. The interface module is coupled between the display device and a printed circuit board (e.g., a central processing unit). The interface module can be coupled to the display device using a flexible circuit. In that case, the interface module is pivotable about the flexible circuit so that it can be positioned in different locations within the computer system, depending on space availability and the constraints of a particular computer system design. Thus, the combination of the interface module, the device, and/or the flexible circuit and can be universally implemented in different designs of portable computer systems, reducing development time and manufacturing costs.

14 Claims, 18 Drawing Sheets

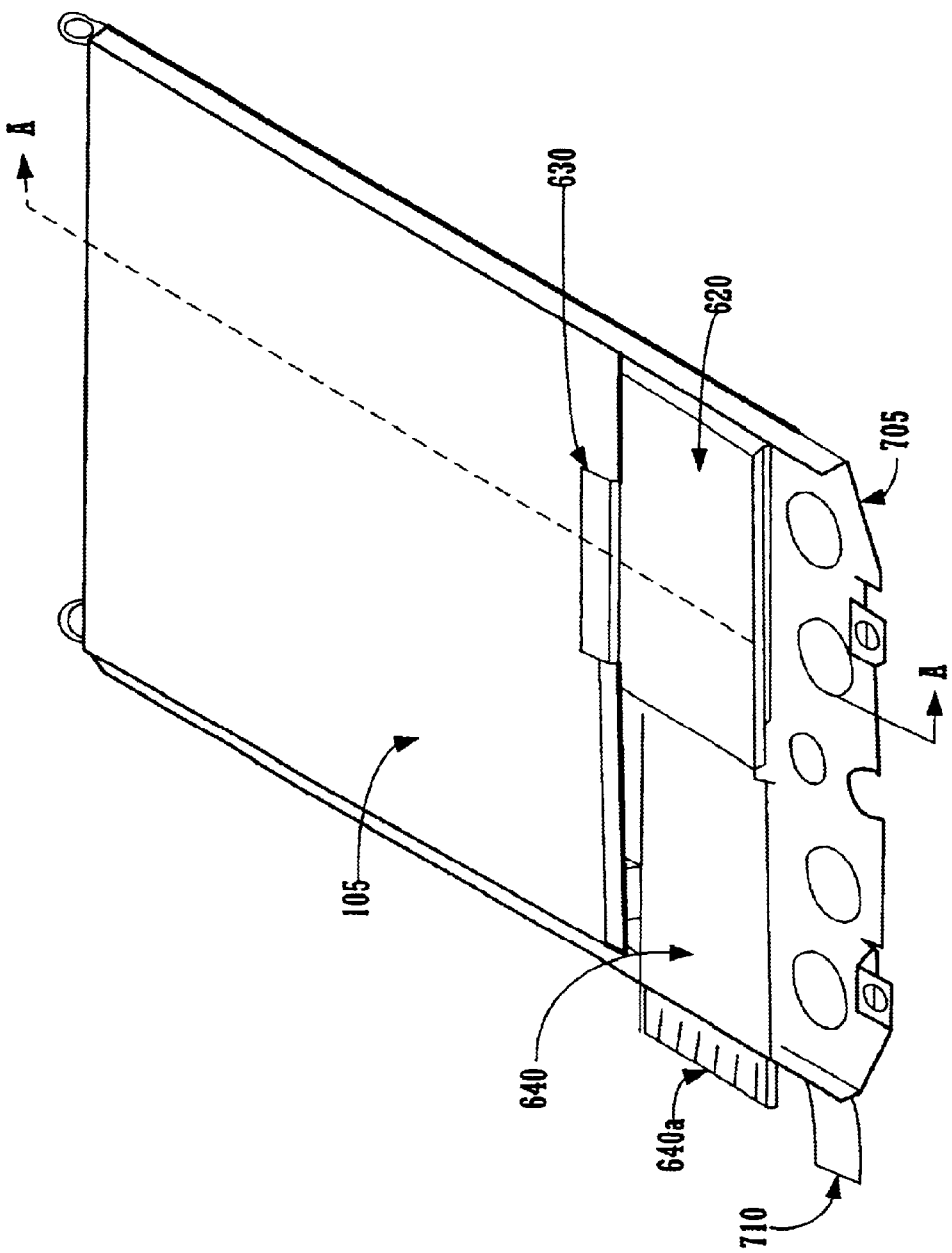

A-A

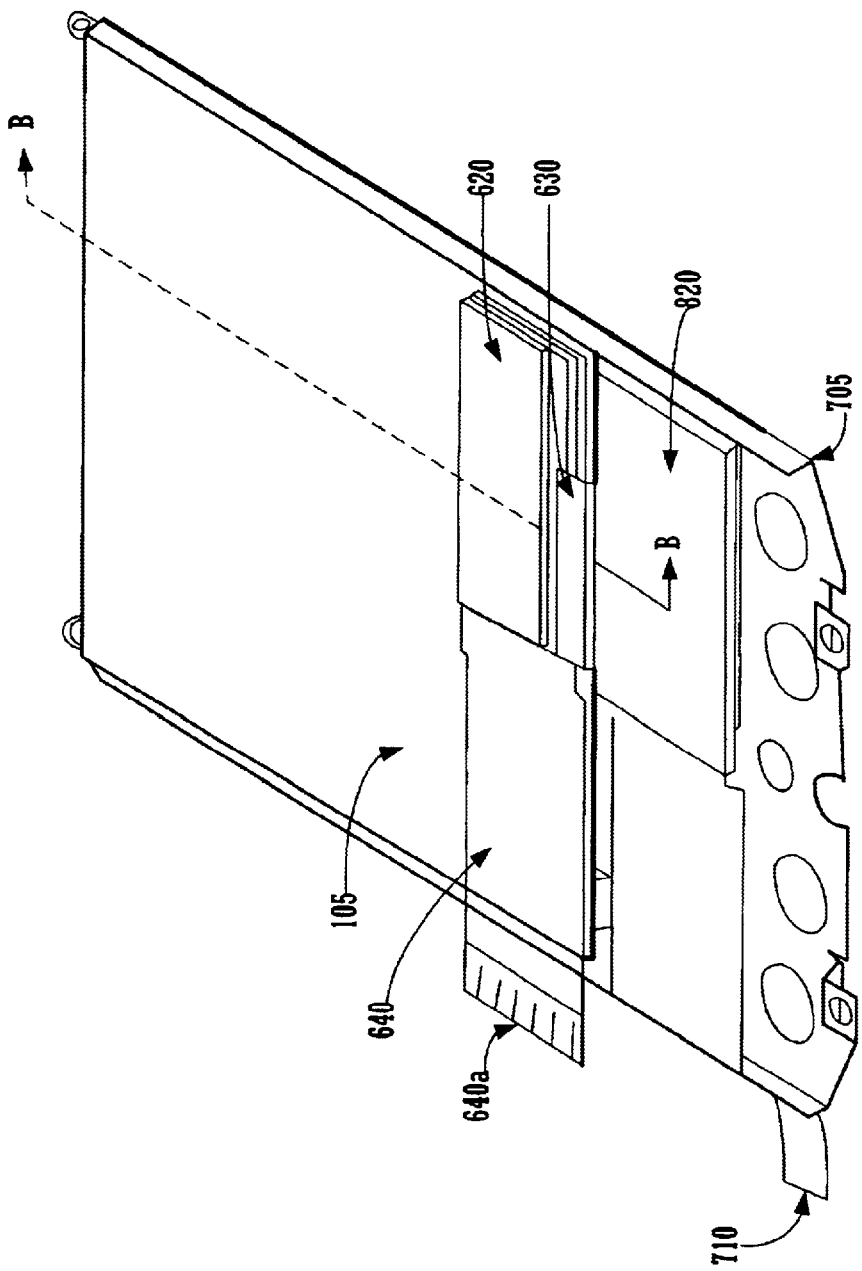

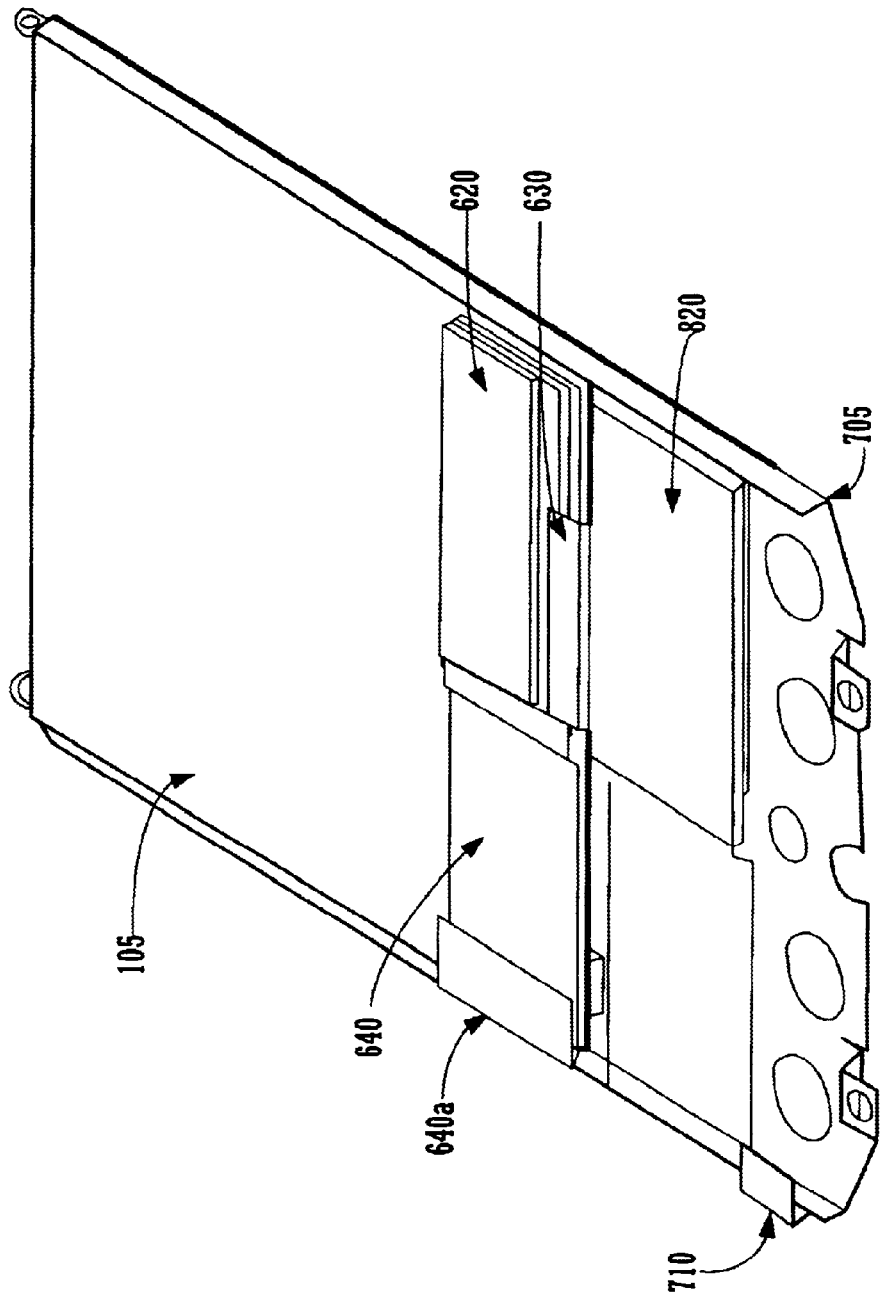

SELECTIVELY RELOCATABLE AND UNIVERSAL INTERFACE MODULE WITH CIRCUITRY FOR A DISPLAY SCREEN

BACKGROUND OF THE INVENTION

1. Field of the Invention

The present invention relates to the field of portable computer systems. Specifically, the present invention relates to a relocatable and universal interface module for a display device that can be installed in different portable computer system designs.

2. Related Art

As the components required to build a computer system are reduced in size, new categories of computer systems are emerging. One of the more recent categories of computer systems is the portable, or "palmtop," computer system or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

Because of their relatively small size, designers of portable computer systems are faced with the challenge of having to fit the various internal components as efficiently as possible into a small housing. This task is complicated because there may be different models built on the same basic platform. Each model may require a different hardware configuration depending on the features it incorporates, yet the internal components must still fit into the standard-size housing.

For example, a palmtop computer system may utilize either a monochrome display device or a color display device. The display screen for the color device is typically thicker than the screen of a monochrome device, and generally there are differences between the circuitry needed to connect and drive a monochrome display device versus a color display device. The display device is typically connected to a printed circuit board, and thus different printed circuit board designs are needed to accommodate differences in the connection circuitry. Each version of a component increases the number of parts to be tracked and managed, thereby complicating the design process.

Variability in design may also be introduced by the different manufacturers and vendors of display devices, each of which may have their own connector scheme and interface circuitry. Thus, the number of printed circuit board designs is increased further to accommodate the different manufacturers, adding more parts that need to be tracked.

Consequently, considering just the display device and associated circuitry, a designer attempting to determine the layout of the components in a portable computer system design must contend with a number of variables. This issue is exacerbated in view of the number of other components that may be used in a palmtop computer system.

In addition, the different types of interface circuitry leads to increased manufacturing costs; specifically, increased tooling costs. For each combination of a monochrome display and interface circuitry, tooling costs can be as much as $100,000, and for each combination of color display and interface circuitry, tooling costs can be as much as $1,000,000.

The layout design process is further complicated by the fact that, even after a layout is decided on, it may need to be modified in order to accommodate design changes, such as the addition of new features or increased capabilities. For example, it may be desirable to add a radio, to relocate an existing component such as a battery, or to add or relocate expansion slots. Because internal components are typically packed fairly tightly together in a palmtop computer system, any significant change will likely make it necessary to rearrange multiple components.

Thus, the layout design process for a portable computer system, and for other similarly complex portable devices, can be complicated and difficult, increasing lead times, development costs, and manufacturing (e.g., tooling) costs.

SUMMARY OF THE INVENTION

Accordingly, what is needed is a system and/or method for simplifying the layout design process for portable devices such as portable computer systems. What is also needed is a system and/or method that accomplishes the above but still allows a degree of flexibility for accommodating design changes. The present invention provides these advantages and others not specifically mentioned above but described in the sections to follow.

The preferred embodiment of the present invention pertains to a portable computer system (e.g., a palmtop or hand-held computer system) with an interface module. In the preferred embodiment, the interface module is coupled between a device and a printed circuit board. The interface module includes circuitry needed to connect with the device and drive the function of the device. Thus, this circuitry does not need to be located on the printed circuit board of the portable computer system. Accordingly, the interface module provides a technology-independent architecture which can be used with different device technologies.

In one embodiment, the interface module is coupled to the device using a first flexible circuit, and coupled to the printed circuit board (e.g., a central processing unit) using a second flexible circuit. The interface module is pivotable about the first flexible circuit so that it can be positioned in different locations within the computer system, depending on space availability and the constraints of a particular computer system design. In this embodiment, the interface module can be flipped from one location to the other, with the first flexible circuit in effect acting as a hinge; in this case, the second flexible circuit can be inverted and coupled to the printed circuit board.

In one embodiment, the interface module and the first flexible circuit are integrated into a single flexible circuit. In another embodiment, the interface module and the second flexible circuit are integrated into a single flexible circuit.

In one embodiment, the device is a display device. In this embodiment, the interface module contains interface circuitry needed to connect with and operate the display device. In accordance with the present invention, a particular supplier can provide the interface module, which would be populated with circuitry according to the supplier's interface scheme. The circuitry in the interface module also depends on whether it is intended for a monochrome display or for a color display.

Thus, in accordance with one embodiment of the present invention, the combination of a device (e.g., a display device) and an interface module, including a flexible circuit, can be implemented in different designs of portable computer systems, simplifying the design process and significantly reducing development time and manufacturing costs.

During product development, leveraging the use of an interchangeable, relocatable interface circuit module across different portable computer system designs can enable faster time to market.

In another embodiment, the interface module can be coupled to a device (e.g., a display device) and/or to the printed circuit board using connectors other than flexible circuits. This embodiment is still advantageous because the interface module provides a universal interface with any of the various types of display technologies and thus is a technology-independent architecture.

BRIEF DESCRIPTION OF THE DRAWINGS

FIGS. 7A, 7B, 7C and 7D are perspective views of a portable computer system with a relocatable interface module in a first location in accordance with one embodiment of the present invention.

FIGS. 8A, 8B, 8C and 8D are perspective views of a portable computer system with a relocatable interface module in a second location in accordance with one embodiment of the present invention.

DETAILED DESCRIPTION OF THE INVENTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Exemplary Palmtop Platform

Figure 1A:
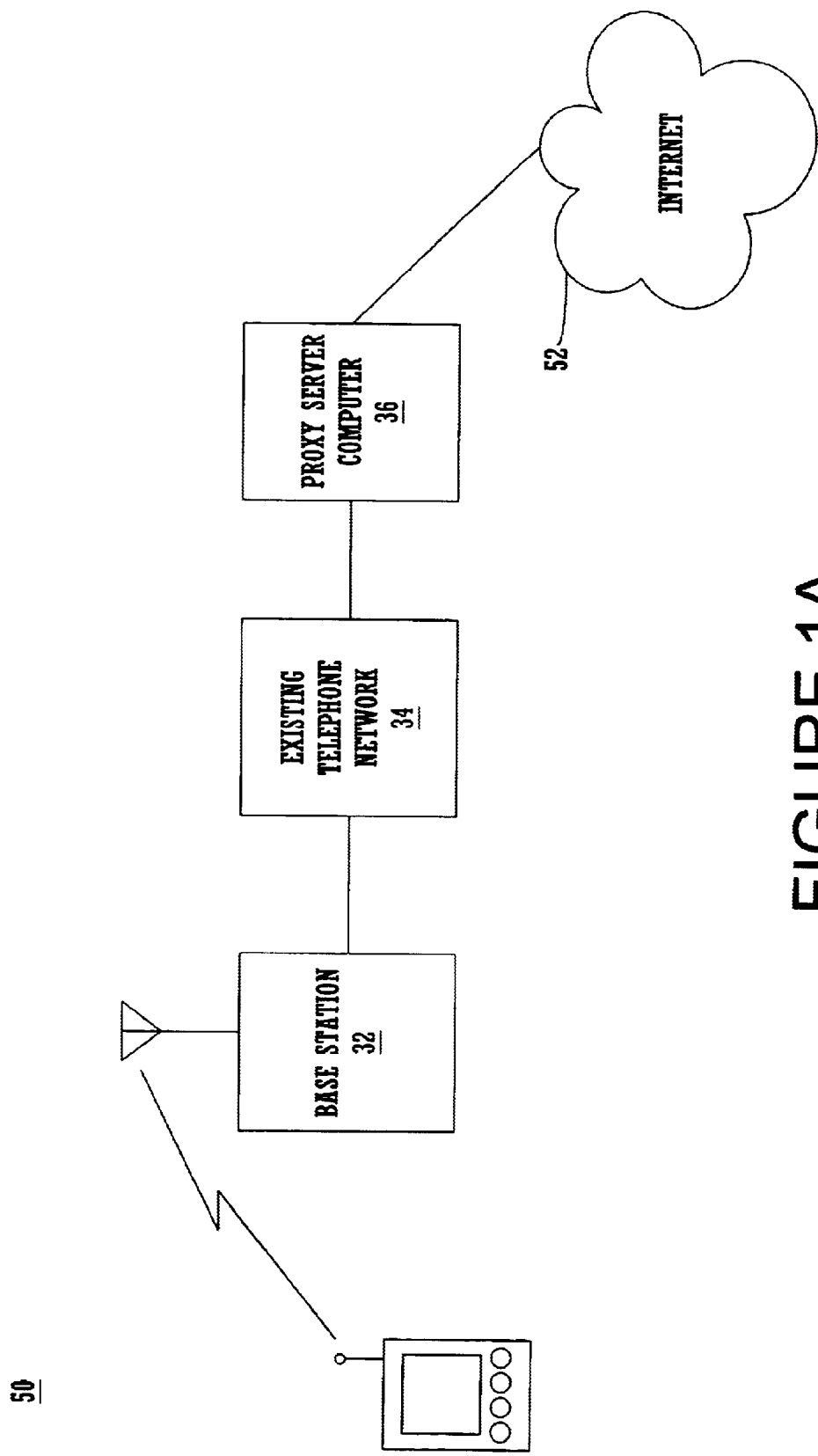
FIG. 1 A is a block diagram of an exemplary network environment including a portable computer system that can be implemented in accordance with one embodiment of the present invention.
FIG. 1B is a block diagram of a portable computer system connected to other computer systems and the Internet via a cradle device that can be implemented in accordance with one embodiment of the present invention.

FIG. 1A is a block diagram of an exemplary network environment 50 including a portable computer system 100 that can be implemented in accordance with one embodiment of the present invention. Portable computer system 100 is also known as a palmtop computer system, a palm-sized computer system, a hand-held computer system, or a personal digital assistant (PDA). Portable computer system 100 has the ability to transmit and receive data and information over a wireless communication interface (e.g., a radio interface).

Base station 32 can be both a transmitter and receiver base station, which can be implemented by coupling it into an existing public telephone network 34. Implemented in this manner, base station 32 enables portable computer system 100 to communicate with a proxy server computer system 36, which is coupled by wire to the existing public telephone network 34. Furthermore, proxy server computer system 36 is coupled to the Internet 52, thereby enabling portable computer system 100 to communicate with the Internet 52. When communicating with a Web site over Internet 52, protocols such as CTP (Compact Transport Protocol) and CML (Compact Markup Language) can be used by portable computer system 100 in the present embodiment.

It should be appreciated that one of the functions of proxy server 36 is to perform operations over the Internet 52 on behalf of portable computer system 100. For example, proxy server 36 has a particular Internet address and acts as a proxy device for portable computer system 100 over the Internet 52. It should be further appreciated that other embodiments of a communications network may be utilized in accordance with the present invention.

The data and information which are communicated between base station 32 and portable computer system 100 are the same type of information and data that can conventionally be transferred and received over a public telephone wire network system. However, a wireless communication interface is utilized to communicate data and information between portable computer system 100 and base station 32. It should be appreciated that one embodiment of a wireless communication system in accordance with the present invention is the Mobitex wireless communication system.

Figure 1B:
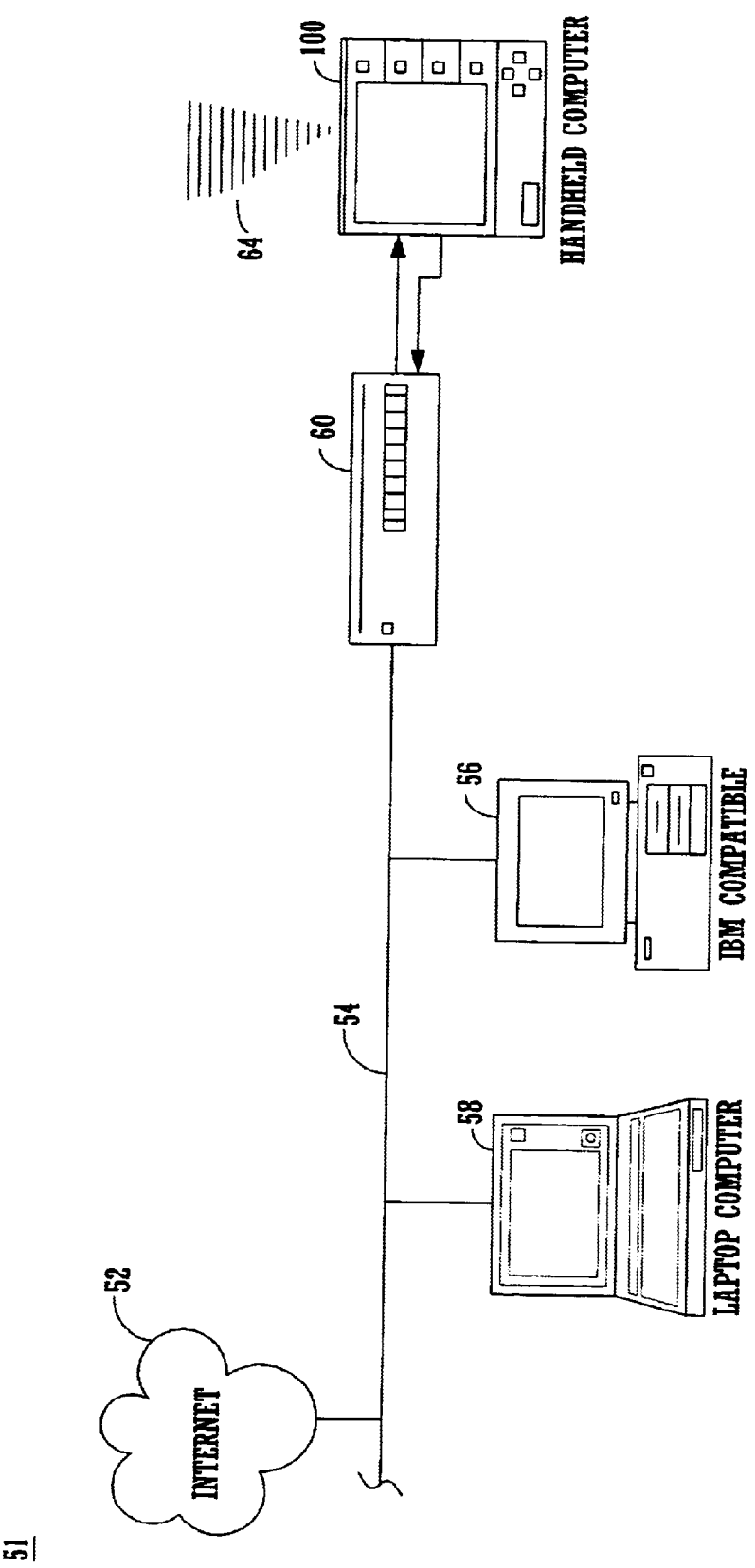

FIG. 1B illustrates another embodiment of a system 51 that can be used in conjunction with various embodiments of the present invention. System 51 comprises a host computer system 56 which can either be a desktop unit as shown, or, alternatively, can be a laptop system 58. Optionally, one or more host computer systems can be used within system 51. Host computer systems 58 and 56 are shown connected to a communication bus 54, which in one embodiment can be a serial communication bus, but could be of any of a number of well known designs, e.g., a parallel bus, Ethernet Local Area Network (LAN), etc. Optionally, bus 54 can provide communication with the Internet 52 using a number of well-known protocols.

Importantly, bus 54 is also coupled to a cradle 60 for receiving and initiating communication with portable computer system 100 of the present invention. Cradle 60 provides an electrical and mechanical communication interface between bus 54 (and anything coupled to bus 54) and the computer system 100 for two-way communications. Portable computer system 100 also contains a wireless infrared communication mechanism 64 for sending and receiving information from other devices.

With reference to both FIGS. 1A and 1B, it is appreciated that portable computer system 100 can be used in a network environment combining elements of networks 50 and 51. That is, portable computer system 100 can include both a wireless infrared communication mechanism and a signal (e.g., radio) receiver/transmitter device.

Figure 2:
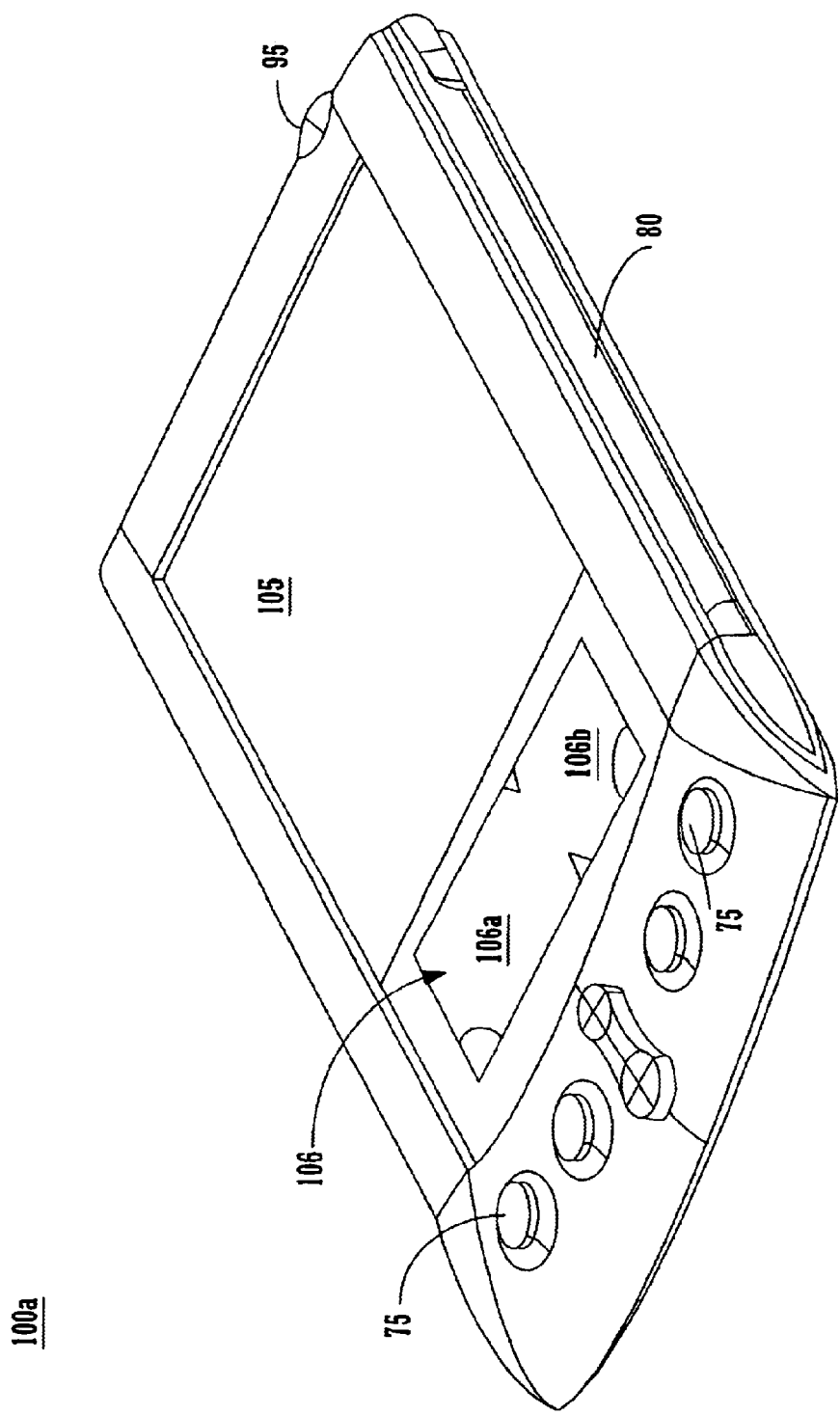
FIG. 2 is a top side perspective view of an exemplary portable computer system that can be used in accordance with one embodiment of the present invention.

FIG. 2 is a perspective illustration of the top face 100a of an exemplary portable computer system 100 that can be used in accordance with one embodiment of the present invention. The top face 100a contains a display device 105 surrounded by a bezel or cover. A removable stylus 80 is also shown. The display device 105 is a touch screen able to register contact between the screen and the tip of the stylus 80. The stylus 80 can be of any material to make contact with the display device 105. The top face 100a also contains one or more dedicated and/or programmable buttons 75 for selecting information and causing the computer system to implement functions. The on/off button 95 is also shown.

FIG. 2 also illustrates a handwriting recognition pad (e.g., an alpha-numeric input device 106) containing two regions 106a and 106b. Alpha-numeric input device 106 is also known as a digitizer, digitizer tablet, or graffiti area. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the display device 105 for verification and/or modification.

Figure 3:
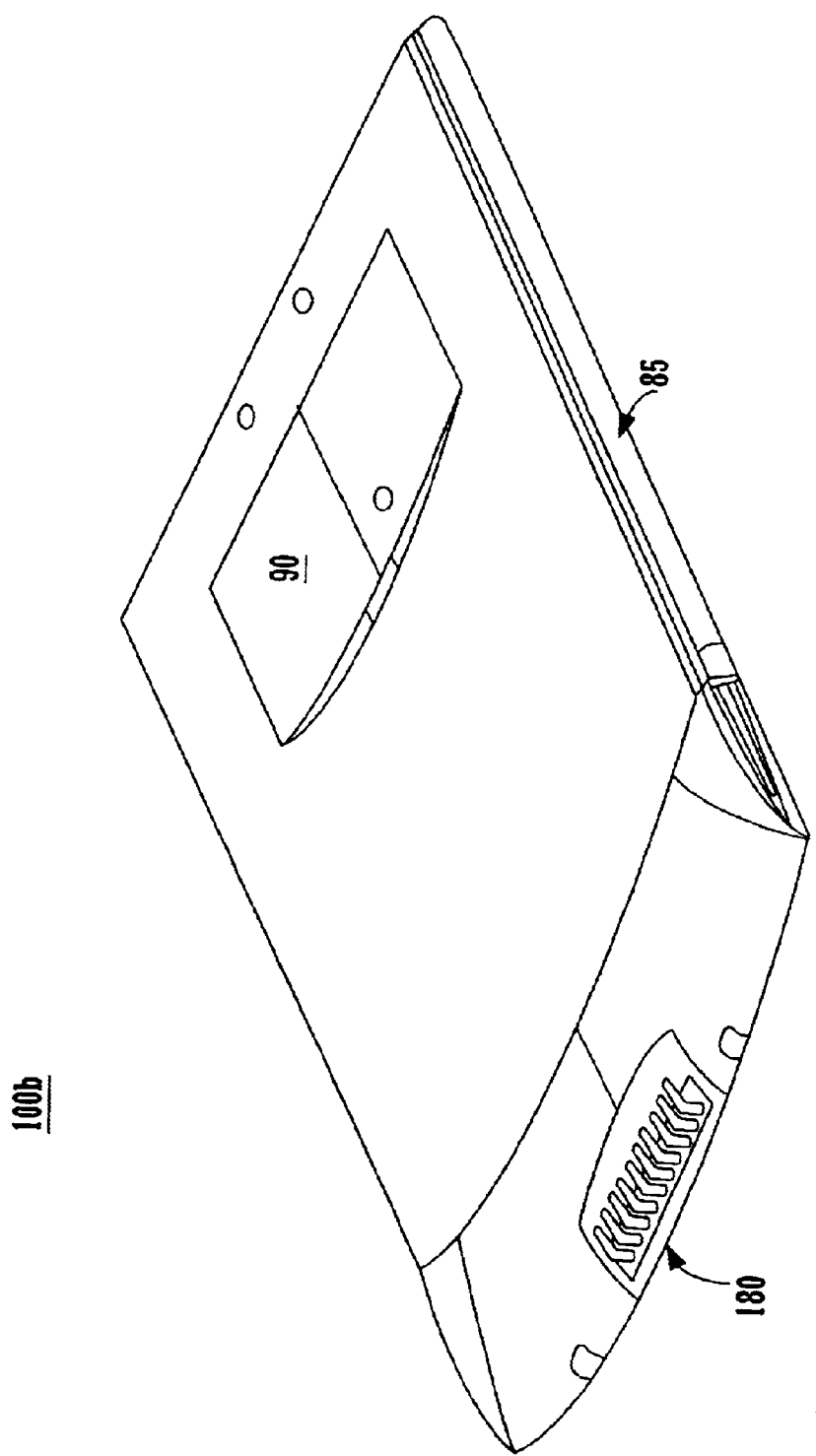
FIG. 3 is a bottom side perspective view of the portable computer system of FIG. 2.

FIG. 3 illustrates the bottom side 100b of one embodiment of the portable computer system that can be used in accordance with various embodiments of the present invention. An extendible antenna 85 is shown, and also a battery storage compartment door 90 is shown. A communication interface 180 is also shown. In one embodiment of the present invention, the communication interface 180 is a serial communication port, but could also alternatively be of any of a number of well-known communication standards and protocols, e.g., parallel, SCSI (small computer system interface), Firewire (IEEE 1394), Ethernet, etc.

Figure 4:
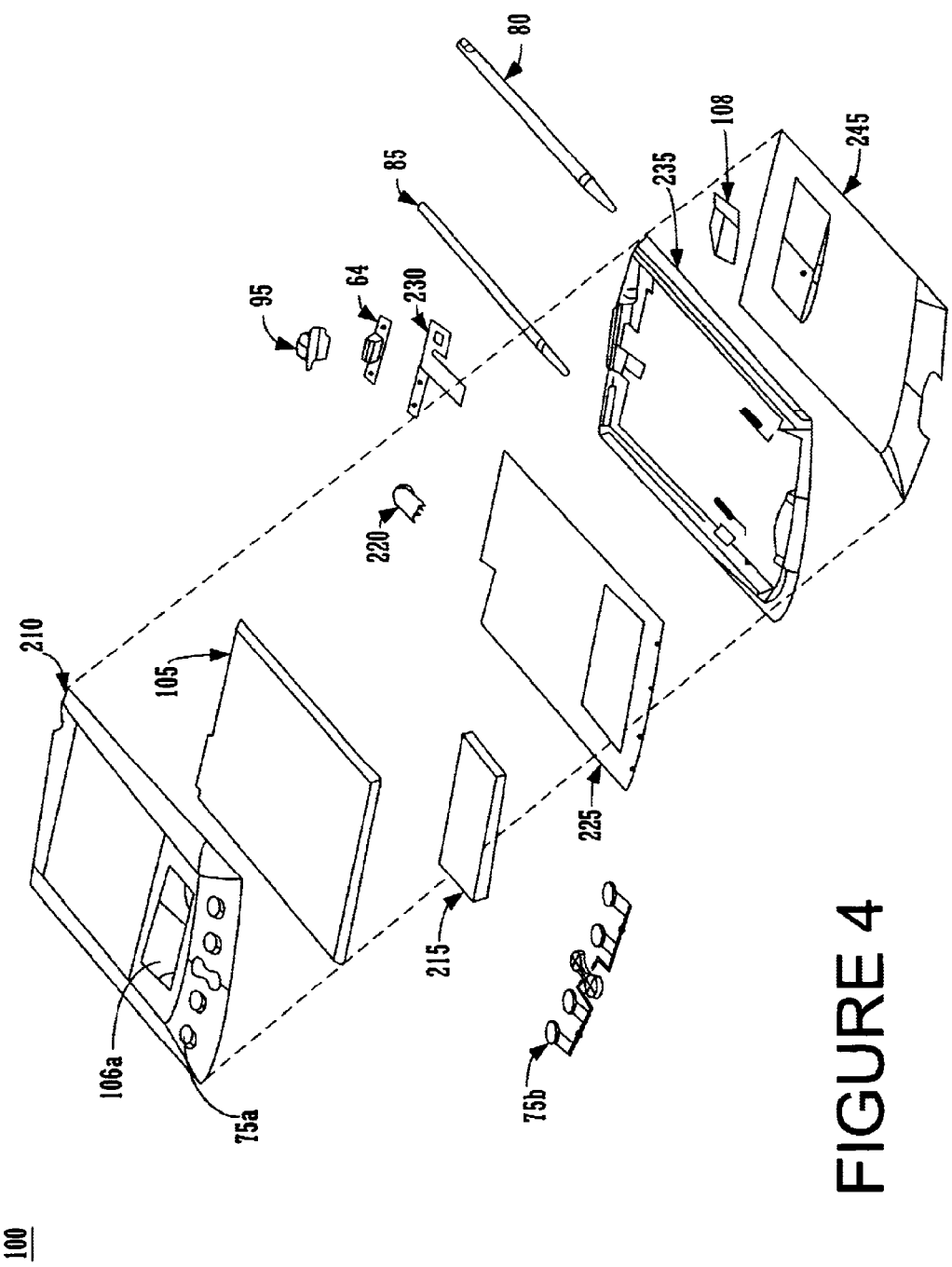
FIG. 4 is an exploded view of the components of the portable computer system of FIG. 2.

FIG. 4 is an exploded view of exemplary portable computer system 100. Portable computer system 100 contains a back cover 245 and a front cover 210 having an outline of alpha-numeric input device 106 and holes 75a for receiving buttons 75b. A flat panel display device 105 (both liquid crystal display and touch screen) fits into front cover 210. Any of a number of display technologies can be used, e.g., liquid crystal display (LCD), field emission display (FED), plasma, etc., for the flat panel display device 105. A battery 215 provides electrical power. A contrast adjustment (potentiometer) 220 is also shown, as well as an on/off button 95. A flexible circuit 230 is shown along with a printed circuit (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1B). A signal (e.g., radio) receiver/transmitter device 108 is also shown. The receiver/transmitter device 108 is coupled to the antenna 85 and also coupled to communicate with the PC board 225. In one implementation the Mobitex wireless communication system is used to provide two-way communication between portable computer system 100 and other networked computers and/or the Internet via a proxy server (see FIG. 1A).

Figure 5:
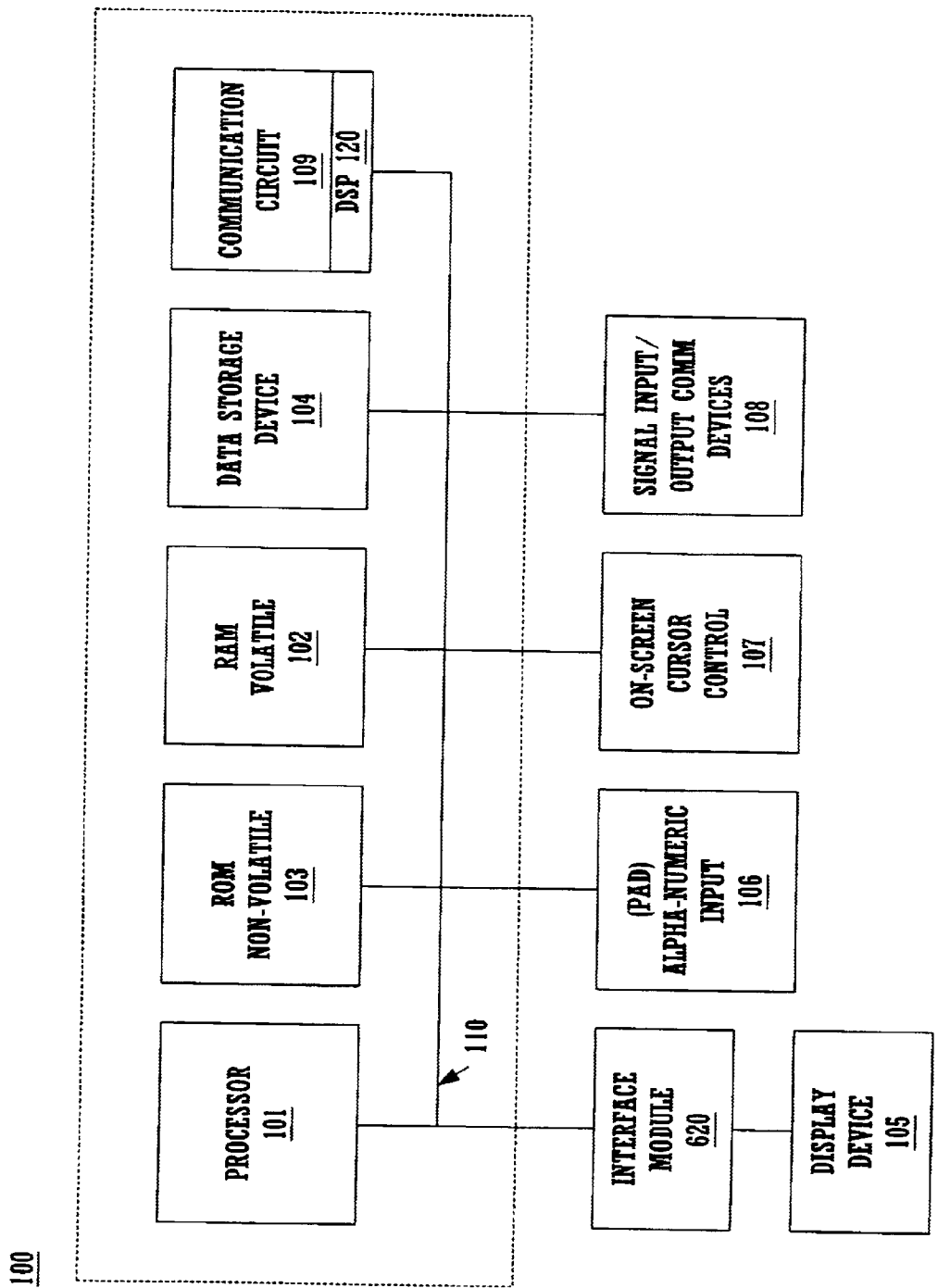
FIG. 5 is a block diagram of one embodiment of a portable computer system in accordance with the present invention.

FIG. 5 illustrates circuitry of exemplary portable computer system 100, some of which can be implemented on PC board 225 (FIG. 4). Portable computer system 100 includes an address/data bus 110 for communicating information, a central processor 101 coupled with the bus for processing information and instructions, a volatile memory 102 (e.g., random access memory, RAM) coupled with the bus 110 for storing information and instructions for the central processor 101 and a non-volatile memory 103 (e.g., read only memory, ROM) coupled with the bus 110 for storing static information and instructions for the processor 101. Portable computer system 100 also includes an optional data storage device 104 (e.g., memory stick) coupled with the bus 110 for storing information and instructions. Data storage device 104 can be removable. As described above, portable computer system 100 also contains a display device 105 coupled to the bus 110 for displaying information to the computer user. PC board 225 can contain the processor 101, the bus 110, the ROM 103 and the RAM 102.

With reference still to FIG. 5, portable computer system 100 also includes a signal transmitter/receiver device 108, which is coupled to bus 110 for providing a physical communication link between portable computer system 100, and a network environment (e.g., network environments 50 and 51 of FIGS. 1A and 1B, respectively). As such, signal transmitter/receiver device 108 enables central processor unit 101 to communicate wirelessly with other electronic systems coupled to the network. It should be appreciated that within the present embodiment, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well suited to be implemented in a wide variety of ways. For example, signal transmitter/receiver device 108 could be implemented as a modem.

In one embodiment, portable computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in portable computer system 100 of FIG. 5 is an optional alpha-numeric input device 106 that in one implementation is a handwriting recognition pad ("digitizer") having regions 106a and 106b (FIG. 2), for instance. Alpha-numeric input device 106 can communicate information and command selections to processor 101. Portable computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact.

The display device 105 utilized with computer system 100 may be a liquid crystal display (LCD) device, a cathode ray tube (CRT), a field emission display device (also called a flat panel CRT) or other display device suitable for generating graphic images and alphanumeric characters recognizable to the user. In a preferred embodiment, display device 105 is a flat panel display. Display device 105 may provide either a monochrome display or a color display.

In accordance with the present invention, display device 105 is coupled to bus 110 via interface module 620. Interface module 620 contains the circuitry needed to connect with and drive display device 105. Interface module 620 can provide a universal interface with any of the various types of display technologies (e.g., LCD, CRT, flat panel CRT and the like, either color or monochrome) and thus is a technology-independent architecture. Additional information with regard to interface module is provided in conjunction with FIG. 6.

Selectively Relocatable and Universal Interface Module

Figure 6:
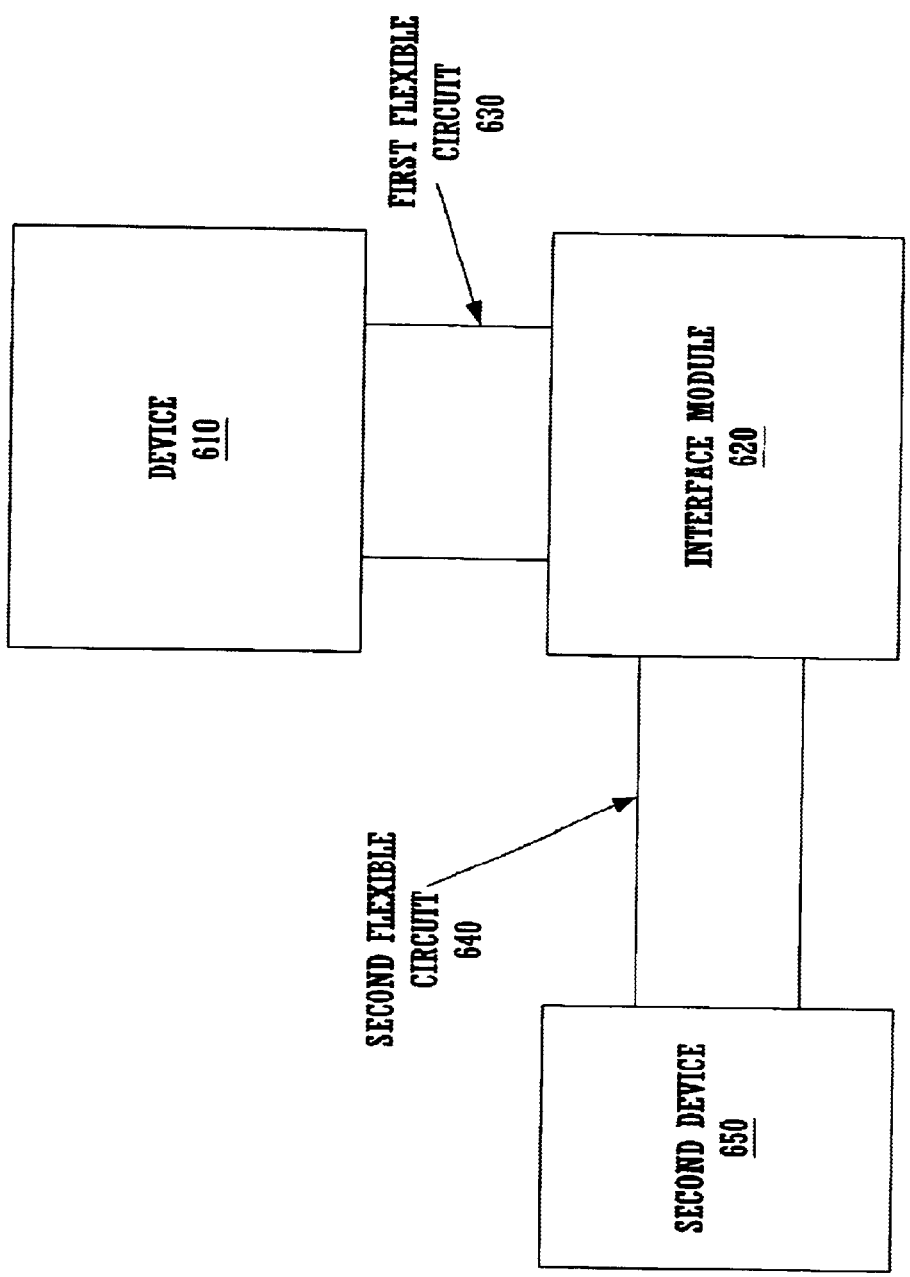
FIG. 6 is a block diagram showing a relocatable interface module with circuitry in accordance with one embodiment of the present invention.

FIG. 6 is a block diagram showing a relocatable interface module 620 for use in a portable computer system (e.g., portable computer system 100 of FIG. 5) in accordance with one embodiment of the present invention. Interface module 620 is coupled to device 610 via a first flexible circuit 630. Device 610 can be any type of device; in a preferred embodiment, device 610 is a display device. As will be seen, first flexible circuit 630 allows interface module 620 to be placed in different locations within portable computer system 100 and remain connected to device 610. Accordingly, the present invention provides flexibility in the layout design process, and it also provides flexibility if there is a need to make modifications to a design as a result of changes to existing features (such as a new location for an expansion slot) or in order to accommodate new or added features (such as a radio).

In the present embodiment, interface module 620 can be coupled to a second device 650 via a second flexible circuit 640. Second device 650 can be any type of device. In one embodiment, second device 650 is a central processing unit (e.g., processor 101 of FIG. 5) coupled to interface module 620 by a second flexible circuit 640. Alternatively, second device 650 is a PC board 225 (FIG. 4) containing a processor 101 and coupled to interface module 620 by second flexible circuit 640.

Continuing with reference to FIG. 6, in the present embodiment, interface module 620 contains the circuitry ("interface circuitry") needed to connect with and drive device 610. Thus, in accordance with the present invention, this interface circuitry is not included on PC board 225. PC board 225 can thus be designed and manufactured independently of device 610. Design variations in device 610 can be accommodated in interface module 620. For example, a particular supplier of device 610 can also provide interface module 620, which would be populated with circuitry according to the supplier's interface scheme needed to connect device 610 with PC board 225. Thus, PC board 225 can be a universal or standardized design, simplifying the process of designing a portable computer system. In addition, by virtue of having a standardized design for PC board 225, the number of parts that need to be tracked can be reduced, further simplifying the design process.

In one embodiment, interface module 620 is a printed circuit board. In another embodiment, interface module 620 and first flexible circuit 630 are integrated into a single flexible circuit. In yet another embodiment, interface module 620 and second flexible circuit 640 are integrated into a single flexible circuit. In still another embodiment, interface module 620, first flexible circuit 630 and second flexible circuit 640 are integrated into a single flexible circuit.

It is appreciated that, in another embodiment, interface module 620 can be coupled to device 610 and/or to second device 650 using a connector other than a flexible circuit; that is, in this embodiment, interface module 620 is not pivotable about a flexible circuit. This embodiment is still advantageous because it can provide a universal interface with any of the various types of display technologies (e.g., LCD, CRT, flat panel CRT and the like, either color or monochrome) and thus is a technology-independent architecture.

In one embodiment, device 610 is a display device (e.g., display device 105 of FIG. 5). Device 610 can be either a color display device or a monochrome display device. In the present embodiment, interface module 620 contains the circuitry that connects with and drives display device 105. Thus, PC board 225 does not need to contain the circuitry needed to drive display device 105. Instead, PC board 225 can be designed and manufactured independent of display device 105. Variations in display device 105, such as the variations associated with a monochrome versus a color display, can be accommodated in interface module 620. As described above, this simplifies the process of designing a portable computer system and reduces the number of parts that need to be tracked.

In accordance with the present invention, although the circuitry in interface module 620 and/or first flexible circuit 630 may be different for the monochrome display versus the color display, the size and shape of interface module 620 and first flexible circuit 630 are the same for a monochrome display as they are for a color display (that is, they have the same "footprint"). Thus, when designing the layout of the internal components for a portable computer system, a designer can allocate a known amount of space for interface module 620, whether designing for a color display or for a monochrome display. As a result, in accordance with the present invention, one of the variables to be considered when designing the layout of internal components is removed, thereby further simplifying the design process.

FIGS. 7A, 7B, 7C and 7D are perspective views showing one embodiment of a bracket 705 that is installed inside a portable computer system (e.g., portable computer system 100 of FIG. 5), along with some of the internal components that are mounted on bracket 705. Of particular interest, relocatable interface module 620 for a display device 105 is shown in accordance with one embodiment of the present invention.

FIG. 7A shows the back (or bottom) side of bracket 705 and of display device 105 in accordance with the present embodiment of the present invention. Display device 105 can provide either a color or monochrome display. In the present embodiment, interface module 620 is positioned in a location adjacent to display device 105 (behind alphanumeric input device 106 of FIG. 2) and coupled to display device 105 using first flexible circuit 630. A second flexible circuit 640 can be used to couple interface module 620 to PC board 225 (FIG. 4) or to processor 101 (FIG. 5). A portion of the second flexible circuit (640*a*) extends beyond bracket 705 to facilitate that connection. Also shown is flexible circuit 710, which is used to couple alpha-numeric input device 106 to PC board 225. A cross-sectional view A—A is shown in FIG. 7E below.

Figure 7B:
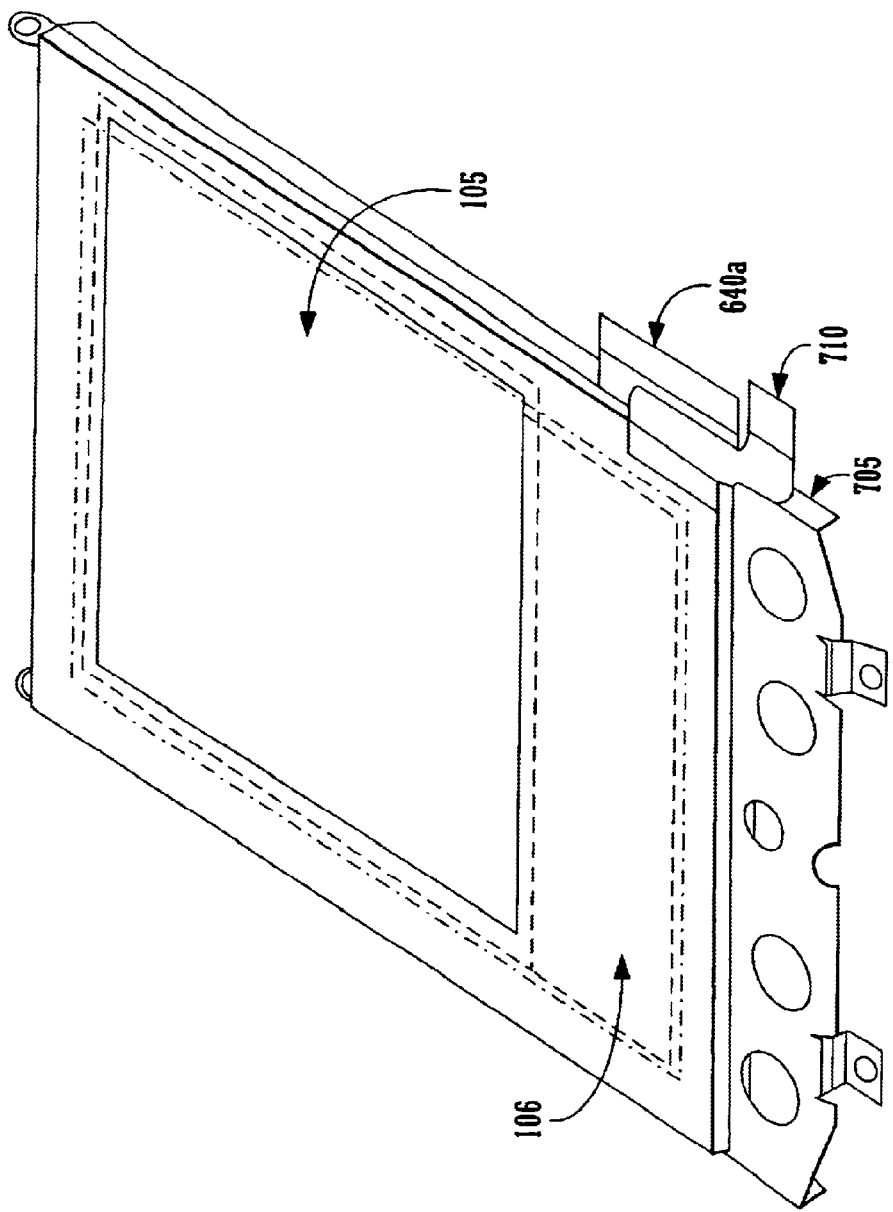

FIG. 7B shows the top side of bracket 705 and of display device 105 in accordance with the present embodiment of the present invention. Interface module 620 (FIG. 7A) is mounted behind alpha-numeric input device 106.

Figure 7C:
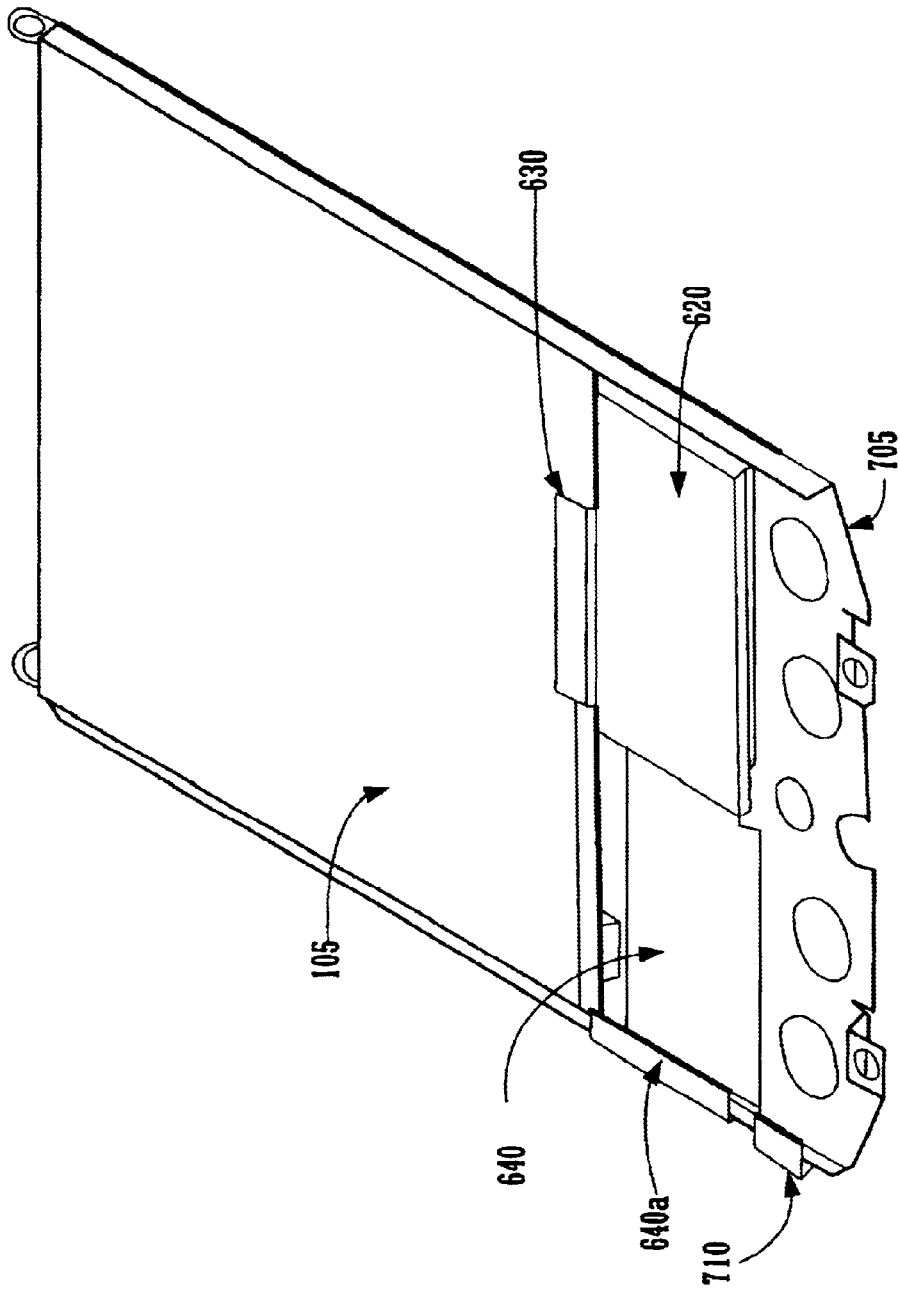

FIG. 7C shows the back (or bottom) side of bracket 705 and of display device 105 in accordance with the present embodiment of the present invention. In the present embodiment, PC board 225 (not shown) is mounted behind (underneath) bracket 705. Thus, the second flexible circuit 640 (specifically, the portion labeled 640*a*) is folded back toward bracket 705 to enable a connection with PC board 225.

Figure 7D:
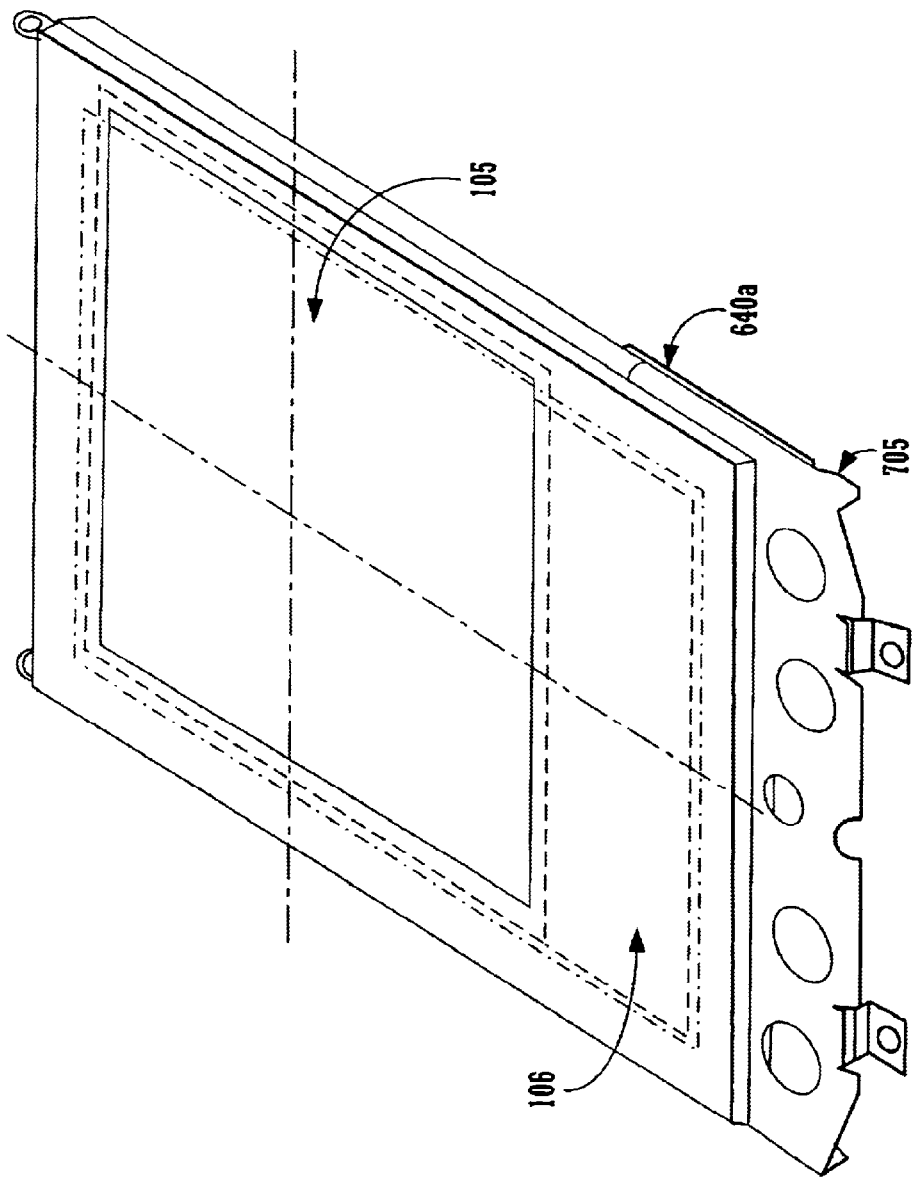
Figure 7E:
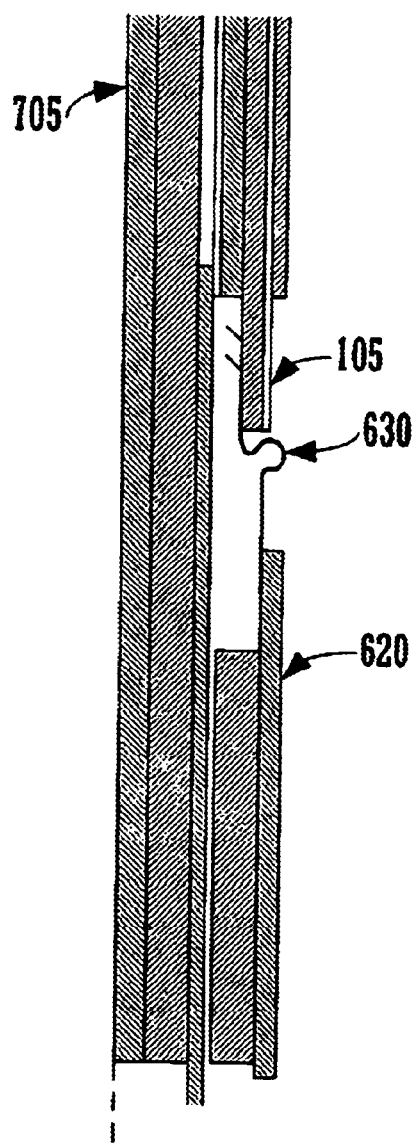
FIG. 7E is a cross-sectional view of an interface module with circuitry in a first position in accordance with one embodiment of the present invention.

FIG. 7D shows the top side of bracket 705 and of display device 105 in accordance with the present embodiment of the present invention, with second flexible circuit 640*a* folded underneath the bracket.

FIG. 7E is a cross-sectional view A—A (FIG. 7A) of bracket 705 in accordance with the present embodiment of the present invention. Interface module 620 is located adjacent to display device 105 and is coupled to the display device via first flexible circuit 630.

FIGS. 8A, 8B, 8C and 8D are perspective views showing another embodiment of a bracket 705 that is installed inside a portable computer system (e.g., portable computer system 100 of FIG. 5), along with some of the internal components that are mounted on bracket 705. Of particular interest, relocatable interface module 620 for a display device 105 is shown in accordance with this embodiment of the present invention.

FIG. 8A shows the back (or bottom) side of bracket 705 and of display device 105 in accordance with the present embodiment of the present invention. Display device 105 can provide either a color or monochrome display. In the present embodiment, interface module 620 is positioned in a location behind (below) display device 105 and coupled to interface module 620 using first flexible circuit 630. With interface module 620 in this position, space is available adjacent to display device 105, and thus a component 820 (e.g., a battery) can be installed in the available space.

A second flexible circuit 640 can be used to couple interface module 620 to PC board 225 (FIG. 4) or to processor 101 (FIG. 5). A portion of the second flexible circuit (640*a*) extends beyond bracket 705 to facilitate that connection. Also shown is flexible circuit 710, which is used to couple alphanumeric input device 106 to PC board 225. A cross-sectional view B—B is shown in FIG. 8E below.

Figure 8B:
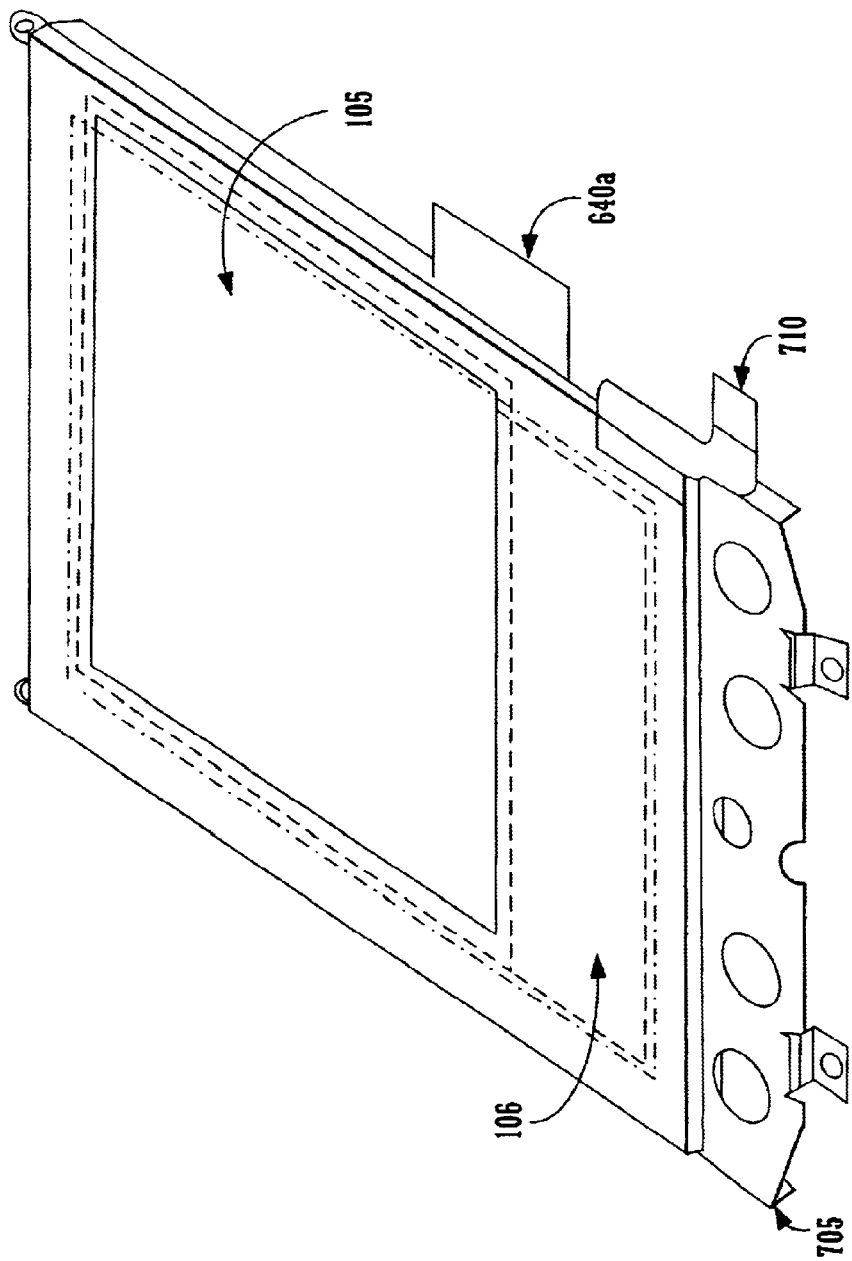

FIG. 8B shows the top side of bracket 705, display device 105 and alpha-numeric input device 106 in accordance with the present embodiment of the present invention. Interface module 620 (FIG. 7A) is mounted behind display device 105.

FIG. 8C shows the back (or bottom) side of bracket 705 and of display device 105 in accordance with the present embodiment of the present invention. In the present embodiment, PC board 225 (not shown) is mounted behind, (underneath) bracket 705. Thus, the second flexible circuit 640 (specifically, the portion labeled 640*a*) is folded back toward bracket 705 to enable a connection with PC board 225.

Figure 8D:
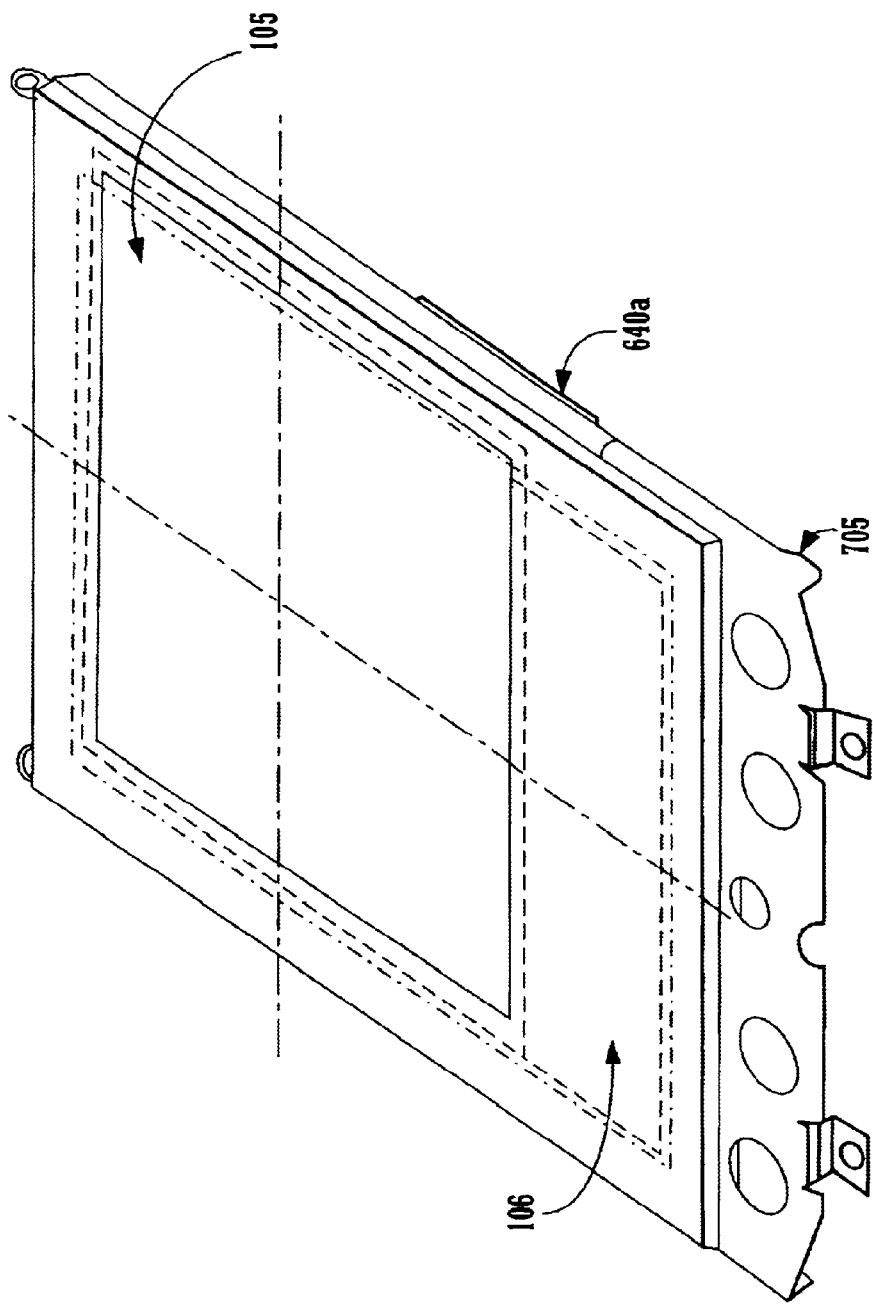
Figure 8E:
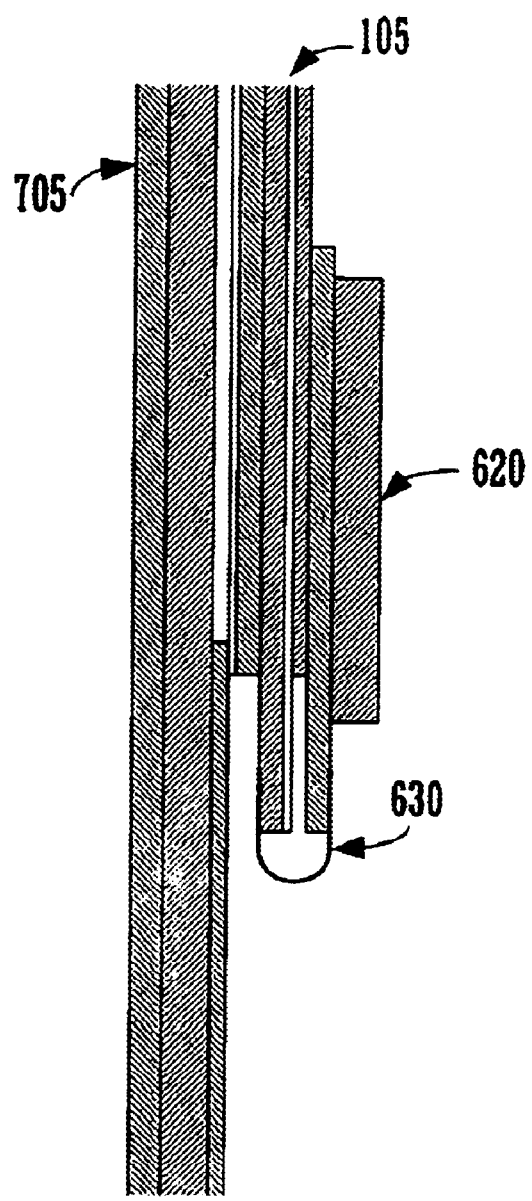
FIG. 8E is a cross-sectional view of an interface module with circuitry in a second position in accordance with one embodiment of the present invention.

FIG. 8D shows the top side of bracket 705, display device 105 and alpha-numeric input device 106 in accordance with the present embodiment of the present invention, with second flexible circuit 640*a* folded underneath the bracket.

FIG. 8E is a cross-sectional view B—B (FIG. 8A) of bracket 705 in accordance with the present embodiment of the present invention. Interface module 620 is located behind display device 105 and is coupled to the display device via first flexible circuit 630. Space is available adjacent to display device for other components (not shown).

Thus, in accordance with the present invention, with reference to FIGS. 7A–7E and 8A–8E, interface module 620 is coupled to a device (e.g., display device 105) using a first flexible circuit 630, and coupled to a processor 101 (FIG. 5) or PC board 225 (FIG. 4) using a second flexible circuit 640. Interface module 620 is pivotable about first flexible circuit 630 so that it can be positioned in different locations within portable computer system 100 (FIG. 5), depending on space availability and the constraints of a particular computer system design. Interface module 620 can be flipped from one location to the other, with first flexible circuit 630 in effect acting as a hinge. Correspondingly, second flexible circuit 640 can be inverted and coupled to processor 101 or PC board 225. The present invention thus can simplify the layout design process while still allowing a degree of flexibility for accommodating design changes.

Figure 9:
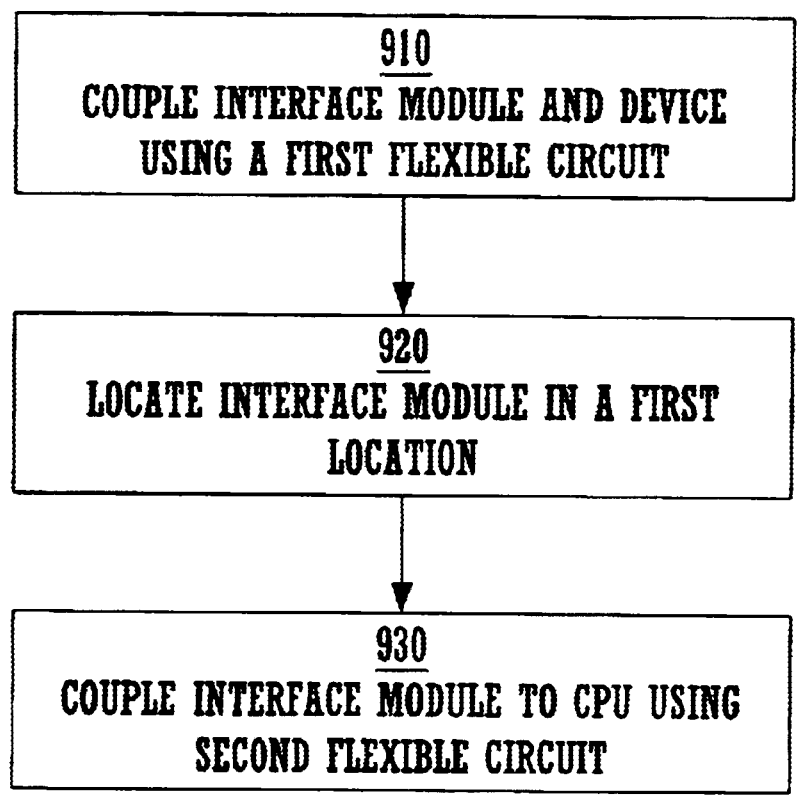
FIG. 9 is a flowchart of the steps in a process for designing a portable computer system using a relocatable interface module in accordance with one embodiment of the present invention.

FIG. 9 is a flowchart of the steps in a process 900 for designing a portable device (e.g., portable computer system 100 of FIG. 5) using a relocatable interface module 620 (FIG. 6) in accordance with one embodiment of the present invention.

In step 910 of FIG. 9, with reference also to FIG. 6, interface module 620 is coupled to device 610 (e.g., display device 105 of FIG. 5) using a first flexible circuit 630. As described above, interface module 620 and first flexible circuit 630 include the circuitry needed to connect with and drive display device 105 and to provide a standardized interface with, for example, PC board 225 (FIG. 4) or processor 101 (FIG. 5).

In step 920 of FIG. 9, interface module 620 can be positioned in different locations depending on space availability and other design constraints, such as the placement of other essential components. In one embodiment, interface module 620 is located adjacent to display device 105 (behind alpha-numeric input device 106) as shown in FIGS. 7A and 7B. In another embodiment, interface module 620 is located behind display device 105 as shown in FIG. 8A. It is appreciated that if, during the design process, a modification in the design causes a change in the layout, then interface module 620 can be repositioned from one location to the other as necessary. Flexible circuit 630 in effect acts as a hinge which allows interface module 620 to be pivoted from one location to another.

In step 930 of FIG. 9, in the present embodiment, interface module 620 can be coupled to a second device (e.g., processor 101 of FIG. 5 or PC board 225 of FIG. 4) using a second flexible circuit 640. With interface module 620 in the position of FIG. 7A, second flexible circuit 640 will have a first orientation; if the interface module 620 is flipped to the position of FIG. 8A, then second flexible circuit 640 can be inverted to a second orientation.

The present invention thus provides a system and method for simplifying the layout design process for portable devices such as portable computer systems while still allowing a degree of flexibility for accommodating design changes. The combination of a device, a flexible circuit, and an interface module in accordance with the present invention can be implemented in different layout designs of portable computer systems, simplifying the design process and reducing development time and costs. A standardized PC board can be used, further simplifying the design process and also reducing the number of parts that need to be tracked. Leveraging the use of an interchangeable, relocatable interface circuit module across different portable computer system designs can enable faster time to market.

The preferred embodiment of the present invention, selectively relocatable and universal interface module with circuitry for a display screen, is thus described. While the present invention has been described in particular embodiments, it should be appreciated that the present invention should not be construed as limited by such embodiments, but rather construed according to the below claims.

What is claimed is:

1. A computer system comprising:

a display device adapted to generate a display according to one type of display technology;

a first flexible circuit coupled to said display device;

an interface module coupled to said first flexible circuit, said interface module coupled by a second flexible circuit to a circuit comprising a processor, said interface module disposed between said circuit and said display device such that signals directed to said display device from said processor pass through said interface module, wherein said interface module comprises interface circuitry specific to said one type of display technology but provides a standardized interface for coupling said display device with said circuit comprising said processor, said standardized interface independent of said one type of display technology; and a housing incorporating said display device, said first flexible circuit, said interface module, said second flexible circuit and said circuit comprising said processor.

2. The computer system of claim 1 wherein said computer system is a portable computer system.

3. The computer system of claim 1 wherein said interface module is a printed circuit board.

4. The computer system of claim 1 wherein said interface module and said first flexible circuit are integrated into a single flexible circuit.

5. The computer system of claim 1 wherein said interface module and said second flexible circuit are integrated into a single flexible circuit.

6. The computer system of claim 1 wherein said display device is a monochrome display device.

7. The computer system of claim 1 wherein said display device is a color display device.

8. A computer system comprising:

a display device for generating a display according to a format;

a first flexible circuit coupled to said display device;

an interface module coupled to said first flexible circuit, said interface module comprising interface circuitry requisite for driving said display according to said format, wherein said display device, first flexible circuit, and said interface module in combination are specific to said format;

a second flexible circuit coupled to said interface module; and a third circuit comprising a processor coupled to said second flexible circuit, wherein signals from said processor are directed through said interface module to said display device, wherein said third circuit is independent of said format;

wherein said interface module and said first flexible circuit provide a standardized interface for coupling said display device that is specific to said format to said third circuit that is independent of said format, said standardized interface independent of said format.

9. The computer system of claim 8 wherein said computer system is a portable computer system.

10. The computer system of claim 8 wherein said interface module is a printed circuit board.

11. The computer system of claim 8 wherein said interface module and said first flexible circuit are integrated into a single flexible circuit.

12. The computer system of claim 8 wherein said interface module and said second flexible circuit are integrated into a single flexible circuit.

13. The computer system of claim 8 wherein said format is a monochrome display.

14. The computer system of claim 8 wherein said format is a color display.

* * * * *